March 12, 1946.    H. NEUMANN ET AL    2,396,598
AIRCRAFT ENGINE COWLING
Filed Jan. 8, 1941    8 Sheets-Sheet 1

Inventors
Heinrich Neumann
Günther Bukowski
Reinhard Ramshorn
Erwin Spiegel
Hans Tornow
by Knight
atty.

March 12, 1946.  H. NEUMANN ET AL  2,396,598
AIRCRAFT ENGINE COWLING
Filed Jan. 8, 1941  8 Sheets-Sheet 2

March 12, 1946.    H. NEUMANN ET AL    2,396,598
AIRCRAFT ENGINE COWLING
Filed Jan. 8, 1941    8 Sheets-Sheet 3

March 12, 1946.   H. NEUMANN ET AL   2,396,598
AIRCRAFT ENGINE COWLING
Filed Jan. 8, 1941   8 Sheets-Sheet 5

March 12, 1946.   H. NEUMANN ET AL   2,396,598
AIRCRAFT ENGINE COWLING
Filed Jan. 8, 1941   8 Sheets-Sheet 8

Patented Mar. 12, 1946

2,396,598

UNITED STATES PATENT OFFICE 2,396,598

AIRCRAFT ENGINE COWLING

Heinrich Neumann, Günther Bukowski, and Reinhard Ramshorn, Munich, and Erwin Spiegel, Berlin - Charlottenburg, and Hans Tonn, Berlin-Treptow, Germany; vested in the Alien Property Custodian Application January 8, 1941, Serial No. 373,622
In Germany October 13, 1939

4 Claims. (Cl. 123—171)

The regulation of the air passage through the fairing of covered bodies, particularly of faired air-cooled power plants of aircrafts, hitherto has been effected by regulating the quantity of air flowing through the fairing by the provision of inlet and outlet port areas capable of being controlled. The conditions of flow in the upstream region of the fairing and in the encompassing air stream have not been taken into account.

It has been found that with faired bodies of the type mentioned it is of essential importance to take into consideration, even when regulating the inlet and outlet cross-sections of the fairing, the outside conditions of flow by intentionally influencing, according to the invention, at least the airflow encompassing the fairing by regulating its direction and velocity. This knowledge is based on the following considerations:

The conditions of flow at the upstream side of a body, e. g. a faired power plant, through and over which air is passing, are dependent upon the flow of air therethrough and the flight speed. The regulation of the air passing through, which on its part is dependent upon the dynamic pressure prevailing anterior to the body and the reaction pressure back of the body i. e. of the pressure drop within the body, has been effected hitherto only by varying the inlet and outlet cross-sectional areas.

The reactions due to changes in the amount of air passing through the body on the upstream side of the airflow and on the airstream encompassing the faired body are so remarkable that with increasing flight speeds a close study of these problems is indispensable. The proportion of the loss in efficiency met with bodies through and over which the air is passing at velocities of, e. g., more than 500 kms. P. H. is scarcely 20% in the interior of the body of faired air-cooled power plants in comparison with the losses outside the body. From the foregoing there results the necessity, even in the case of a small amount of air flowing through faired bodies of the kind described, i. e., when keeping the quantity of the cooling air passing through the body within economical limits, of paying the utmost attention to the conditions of flow of the encompassing airstream and at the upstream side of the fairing.

The airflow anterior to a body of the kind described above, with a fairing of known form and even with means for controlling the flow of air through the body for limiting the cooling air passage, shows a region of slowed down flow setting up itself in front of the body. This region of flow has the form of a body of revolution along the limit surface of which the outer airflow moves. The more the adjustment is for a smaller amount of air passing through the body and the higher the flight speed, the steeper the contour of this body of revolution is with respect to the outline of the faired body. Hence it follows that to the outer airflow moving along the body of revolution (boundary line of flow) before encompassing the faired body is imparted a very marked angular deviation. This will cause in the outer airflow on the faired body a crowding of the lines of flow i. e. a local increase of velocity and lateral forces. These lateral forces are in the main responsible for the high loss in power for surmounting the drag.

These losses are avoided, according to the invention, by designing and arranging the fairing in such a manner, that the velocity of the airflow encompassing the fairing is influenced as to its amount and direction and this in such a way, that up to its largest cross-section no accelerations of the airflow increasing the velocity of the air encompassing the body considerably above the flight speed occur i. e. the angular deviation of the airflow is intentionally kept small.

In case the velocity of the throughflowing air is slowed down in front of the inlet cross-section of the fairing, the conditions of flow at the upstream side of the body are improved, according to the invention, in such a way that the boundary line of flow of the slowed down airflow by correspondingly outlining the fairing and its regulating parts is flattened early enough that the air passing over the edge of the inlet port of the fairing shows a course without accelerations i. e. a continuous course. The flattening of the boundary line of flow can be effected by a streamlined displacement body hereinafter called an "aerodynamic body," capable of being displaced into the upstream region in the direction of axis of the fairing anterior to the port area of the fairing. Further it is possible to flatten the boundary line of flow by designing the fairing or parts of it so that it can be controlled axially and/or diametrically in proximity to the inlet port area of the aerodynamic body or by producing a branched off partial stream attuned to the velocity character of the throughflowing air for flattening the boundary line of flow, so that the said boundary line of flow encompassing the throughflowing air and the partial stream is displaced outwardly i. e. flattened in accordance with the intensity of the partial stream. The branching of a partial stream can be effected on the displacement body or in the vicinity of the border of the inlet port of the fairing by a corresponding subdivision in such a way that nozzle-like conduits are produced, the cross-sectional area of which is larger at the inlet of the branched off partial stream than their outlet cross-sectional area.

Owing to the flattening of boundary line of flow the angle between the oncoming outer air and the fairing to be encompassed is reduced to such a degree that the lateral forces in the outer air flow diminish i. e. the depression zone in the vicinity of the border of the inlet opening is declining.

A further development of the invention is the possibility of influencing the conditions of flow at the upstream side of the fairing by outlining the fairing in such way and by placing the inlet port area for the throughflowing air at such a distance in front of the fairing into the upstream region of flow, that due to the angles between the oncoming airflow and the fairing, the angular variation in the path covered by the airflow is kept small and thus no sudden accelerations of the airflow encompassing the fairing from the branching point to the largest cross-section of the fairing occur. With fairings of the kind described, the more declining a zone of slowed down flow is produced anterior to the inlet port, the more the inflow velocity of the through flowing air into the fairing is attuned to the velocity of the encompassing airflow at the branching point.

A markedly forward extending fairing designed in accordance with these points in view, the inlet cross-section of which is dimensioned for an inflow velocity in accordance with the climbing speed, can be improved by displacing the already mentioned aerodynamic body into the upstream part of airflow, so that with a higher flight speed no slowing down of the oncoming airflow occurs at the regulating point. In this manner the losses at the branching point of the throughflowing and the encompassing airflow can be reduced to a minimum owing to the tuning of the throughflow velocity to the velocity of the encompassing airflow.

As the amount of air passing through a faired body, particularly through faired air-cooled power plants must be controlled in dependence upon the engine performance whereas the inlet and/or outlet cross-sections of the fairing must be regulated corresponding to the attitude of flight, particularly in the case of lower dynamic pressures during climbing, and as the velocity of the upstream part of the airflow is varying according to flying attitude and performance, it is necessary to control the velocity of the air stream flowing against, over and through the fairing in accordance with the flight speed, the performance conditioned throughflow of air and the attitude of flight. Controlling of faired bodies with a reduced velocity of the oncoming airflow can be done by displacing the aerodynamic body into the oncoming airflow or the fairing relatively to the aerodynamic body or by varying the dimensions of the superimposed branched off partial stream in accordance with the operating conditions. The regulation can also be effected by a combination of a variation of the branched off partial stream with the adjustment of the aerodynamic body with respect to the fairing.

With faired bodies through and over which an airflow is travelling and in which the inflow velocity of the air flowing through the fairing is equal to the flight speed i. e. with bodies, with which the airflow in the upstream region is practically not slowed down, controlling may take place in such a manner, that the velocity of the throughflowing air stream at the inlet port into the fairing, no matter what amount of air is passing through, is approximately equal to the actual velocity of the encompassing airflow in all flying attitudes.

Some examples of construction with the essential parts of the invention are shown in the drawings, wherein.

Figure 1:
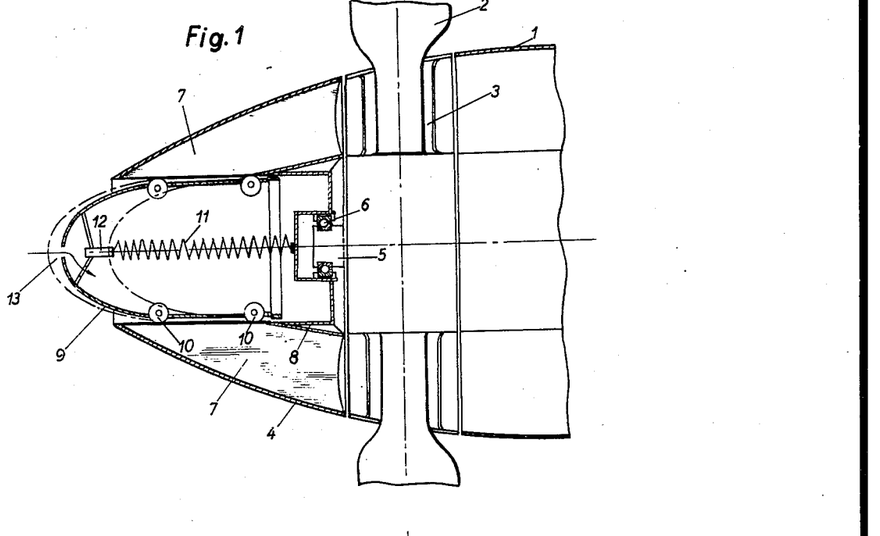
Fig. 1 is a section through a power plant fairing provided with a tractor propeller.

The aircraft power plant (not represented), faired with the cowling 1, is provided in the example of construction with a traction screw 2, the roots of which are provided with a special fairing 3, which may be shaped in the manner of a fan. On the propeller hub or a part of the propeller a fairing 4 is provided merging into the cowling 1. The propeller hub fairing 4 is in the example of construction mounted for rotation on an extension 5 of the propeller hub casing by means of bearings 6. The fairing 4 is provided interiorly with special ribs or webs 7 extending preferably radially in the direction of the axis of the fairing. Within the fairing at these webs 7 a special cup 8 is provided, which is preferably of annular form and tightened against the propeller hub, with which a streamlined body 9 engages, which latter can be displaced according to the circumstances through the orifice of the fairing 4 into the upstream region for influencing the encompassing and throughflowing airstream. The mounting of the body 9 is preferably on rolls 10 rolling on the edges of the webs 7. Within the body 9 a returning force in the form a helical spring 11 is provided, which preferably compensates the frictional resistances of the body 9. The value of the returning force can be varied by a particular adjustment device 12. The body 9 is provided in the direction of flight with an aperture 13, through which the dynamic pressure is permitted to enter. The dynamic pressure entering the body 9 through the aperture 13 will displace the body in the direction of flight. The displacement of the body 9 is effected automatically, i. e. only in accordance with the attitude of flight (dynamic pressure, angle of inclination and want of cooling air). The mode of operation is as follows:

With the climbing aircraft, the body 9 abuts in its deepest position within the fairing 4 on the bottom of the cup 8. In this position the spring may be given a pretension. The pretension can be varied according to the different seasons to take into account the different outside temperatures. When climbing the dynamic pressure and hence the deviation of the encompassing airstream is not considerable, so that the body 9 is advanced only immaterially out of the fairing 4, a further undesired displacement of the body 9 during climbing being prevented owing to the inclined position of the aircraft. Thus it is always possible to adjust the desired inlet port area between the body 9 and the fairing 4 for the passage of the cooling air with the point of view, that the throughflow velocity is equal to that of the encompassing air, which latter is eventually equal to the flight speed.

The webs 7 preferably act as guiding surfaces within the fairing 4 and are arranged at such an angle that with increasing throughflow of air within the fairing 4 the latter is made to rotate opposite to the direction of rotation of the propeller. In this manner the delivery output of the fairing 3 of the propeller acting as blower is considerably increased, as the air supplied to this blower, is delivered under a certain angle, which is variable with the flight speed, the air density and the adjusted throughflow of air. In this manner behind the blower a course of flow approximately in the direction of the axis is produced and eventually a reduction of the controlling path of the body 9 is obtained by the blower action of the fairing 4.

If the aircraft is passing into level flight and the flight speed is increased, then the dynamic pressure within the body 9 is likewise increasing, so that it is further displaced out of the fairing 4 into the upstream region of the fairing. The body 9 and the fairing 4 are so dimensioned that the boundary line of flow between the body 9 and the fairing 4 is flattened and that further the throughflow velocity of the air entering the fairing 4 is equal or approximately equal to the velocity of the airflow encompassing the fairing 4. When the aircraft is more or less diving the body 9 completely leaves the fairing 4 and the inlet port area can be completely or partly closed in order to reduce the total resistance still further, as in this attitude of flight the throughflow of air can be kept very small or completely cut-off.

The mounting of the body 9 by means of rollers 10 in the manner of a car results in a favourable guide and causes little friction losses. It is of course possible for the fairing 4 and the aerodynamic body 9 instead of being mounted on a bearing 6 to be mounted for free rotation anterior to the propeller, or to drive the fairing through an interposed gearing oppositely to the direction of rotation of the propeller, and even with a higher speed than the propeller in order to increase, as already mentioned, the action of the guiding surfaces 7.

Figure 2:
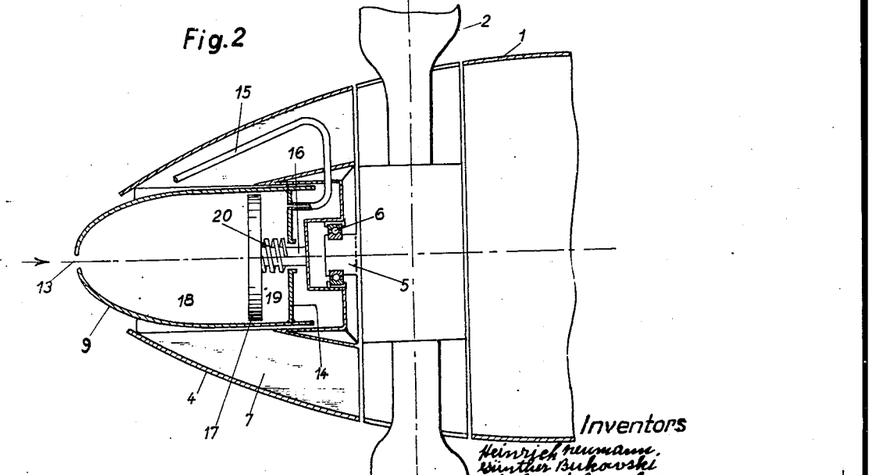
Fig. 2 is a section through a fairing with automatic control means.

Figure 2 shows an embodiment similar in its principles to Figure 1, however with the difference that the body 9 is adjusted automatically in accordance with the velocity of the throughflowing air and the flight speed. For this purpose the body 9 is provided in the fairing 4 with a rear wall 14. With the rear wall 14 a conduit 15 is connected, in which may be inserted for additional damping throttle members or the like, to avoid oscillation. The conduit 15 can be extended up to the inlet port area and exposed to the total pressure of the throughflowing air. The body 9 with the rear wall 14 is movably mounted on an extension 16. One end of the extension 16 is connected with a partition wall 17 subdividing the body 9 into two chambers, of which the chamber 18 is directly exposed to the dynamic pressure, whilst in the chamber 19 through the conduit 15 the total pressure of the throughflowing air is prevailing. The pressure in the chamber 19 can be counteracted by a special traction spring 20. The measuring point of the conduit 15 can be placed so that the return spring must not be too strong.

Owing to the fact that the body 9 is displaced into its upstream region by the difference between the dynamic pressure acting on it and the total pressure of the throughflowing air, the velocity of the throughflowing air adjusts itself in all attitudes of flight approximately equal to the velocity of the airflow encompassing the fairing 4.

The following figures show the possibility of attuning the throughflow to the flight speed, with a further readjustment of the rate of throughflow.

Figure 3:
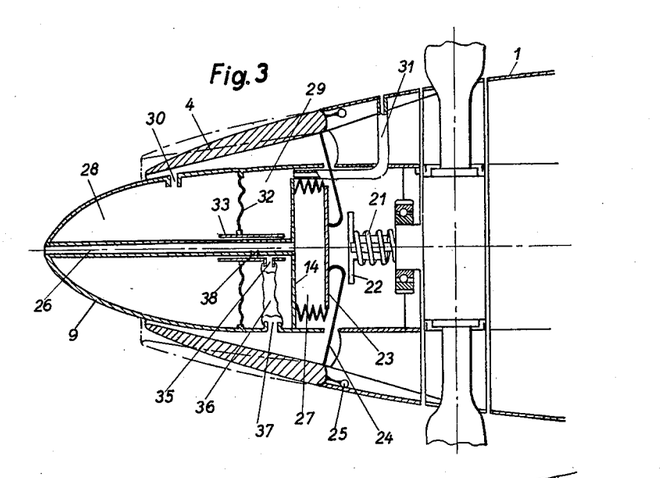
Figs. 3 and 4 show a section through a propeller cap, the inlet port area of which is automatically controlled in such a way that the velocity of the throughflowing air stream is the same as that encompassing the fairing.

Fig. 3 shows a fairing, in which by means of a number of measuring points the inlet port area of the fairing is varied in accordance with the flight speed. In the example of construction the front part of the fairing, preferably consisting of resilient material or a plurality of interengaging parts, is pivoted about the fulcrum 25 against the pressure of the spring 21 acting through the intermediate piece 22, the disc 23 and the arms 24. Owing to this pivoting motion the inlet cross-section is completely opened as represented by the position shown in dotted lines. With increasing flight speed an increasing dynamic pressure is produced anterior to the aerodynamic body 9 which is not movable in the direction of its axis, said pressure being effective through the conduit 26 also in the chamber 27 and acting on the disc 23 against the spring 21 to produce a diminution of the inlet cross-section of the fairing 4. The disc 23 is connected to the rear wall 14 of the fixed body 9 by a particular diaphragm joint. In order to obtain a far-reaching and automatic equalisation of velocity of the air flowing through the annular inlet opening to the velocity of the air flow encompassing the fairing part 4, the space enclosed by the aerodynamic body 9 is subdivided in two chambers 28 and 29. The chamber 28 is in communication with the inlet cross-section through one or more apertures 30 within the region of said inlet port area, whereas the other chamber 29 is in communication with the external airflow through special conduits 31. The subdivision of the aerodynamic body 9 is effected by the arrangement of a diaphragm 32, which is rigidly connected with the body 9 and a sleeve 33 slidable in the direction of axis. The sleeve 33 is provided with an opening 35, which is in connection with the inlet conduit 26 and a movable intermediate member 36 to an aperture 37.

In the case of overpressure in the chamber 29 relatively to the chamber 28 the sleeve 33 is displaced in the direction of flight by the diaphragm 32 i. e. when in comparison with the velocity of flow of the atmosphere the velocity of flow of the air passing through the fairing is too high. The sleeve 33 is finally brought into a position, in which the air can escape from the inlet conduit 26 through the apertures 38, 35, 37 and the intermediate member 36 into the inlet passage. In this position the pressure in the chamber 27 diminishes. The disc 23 is now displaced by the spring 21 in the direction of flight, which causes a pivoting motion of the fairing part 4 with the help of the arm 24 about the fulcrums 25 with a view to enlarge the inlet port area. Owing to this enlargement of the through-flow cross-section the velocity of the throughflowing air is reduced and the pressure in the inlet conduit and in the chamber 28 increased. The sleeve 33 is then displaced in the direction of axis oppositely to the direction of flight and the aperture 38 is closed.

By properly designing the different control parts it is possible taking into consideration the controlling force of the spring 21 and the conditions of flow prevailing during operation and the pressures occurring in the different above mentioned chambers, to establish any desired ratio between the velocity of the air passing through the fairing and the velocity of the air encompassing the fairing. It is further possible to design the control parts for the regulation of the inlet port area so that the inlet velocity of the throughflowing air is approximately always equal to the velocity of the airflow encompassing the fairing 4 and the latter eventually equal to the flight speed.

Figure 4:
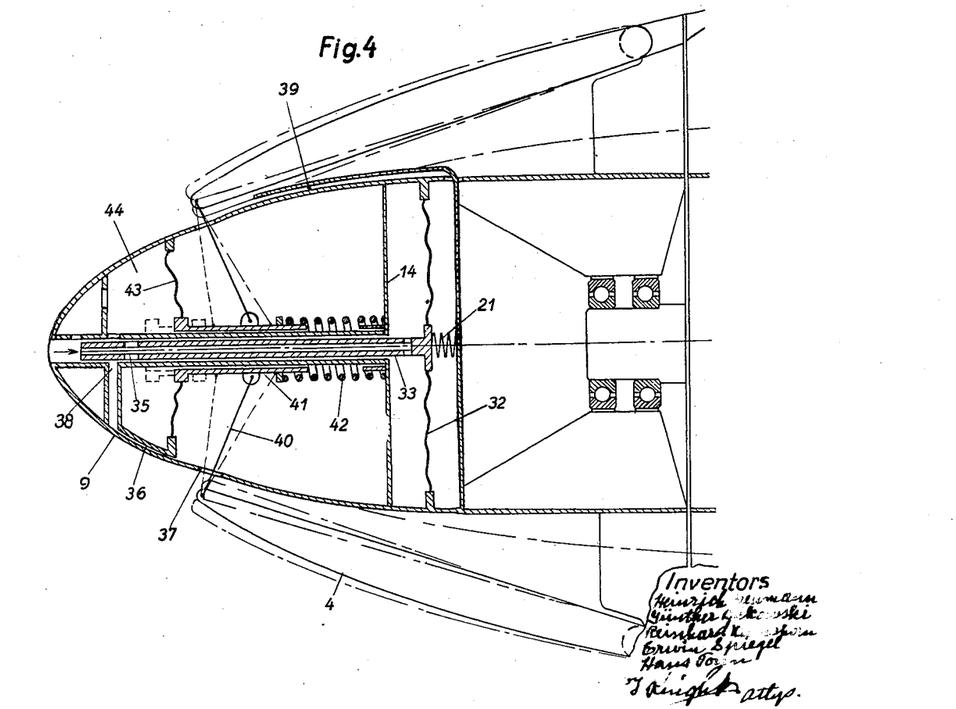

In Figure 4 the regulation of the interiorly arranged sleeve 33 is effected in a similar way as in Figure 3 by a diaphragm 32, which is exposed on the one hand to the influence of the dynamic pressure anterior to the aerodynamic body 9 and on the other through the conduit 39 to the influence of the total pressure in the inlet cross-section. The diaphragm 32 can be simultaneously submitted to the influence of a spring 21.

In order to control the dimensions of the inlet, the fairing 4 can be given a variable cross-section or can be displaced, as shown in the example of construction of Figure 3, with the help of a linkage 40 pivotally connected to a sleeve 41. The sleeve 41 is arranged slidably in the direction of the axis and submitted simultaneously to the influence of a spring 42 acting in the direction to cause enlargement of the inlet cross-section and to the influence of a further diaphragm 43, which on its part is influenced by the pressure in the inlet cross-section and the dynamic pressure anterior to the aerodynamic body 9, which also in this case cannot be moved. With an increasing dynamic pressure the pressure in the space 44 in front of the diaphragm 43 is increasing, so that with increasing flight speed the sleeve 41 is displaced in the direction of a variation of the inlet cross-section against the action of the spring 42. If the velocity of the throughflowing air and hence the total pressure in the conduit 39 is too high, the sleeve 33 is displaced in the direction of flight. Thus a communication is established with the inlet conduit through the apertures 35, 38, the conduit 36 and the aperture 37, so that the pressure in the chamber 44 diminishes. The sleeve 41 is then again displaced in the direction of flight and the fairing 4 moved outwards through the linkage 40. This will be followed by an enlargement of the inlet cross section and by reduction of the velocity of the throughflow in the inlet, so that also the pressure in the conduit 39 is diminshed.

Figure 5:
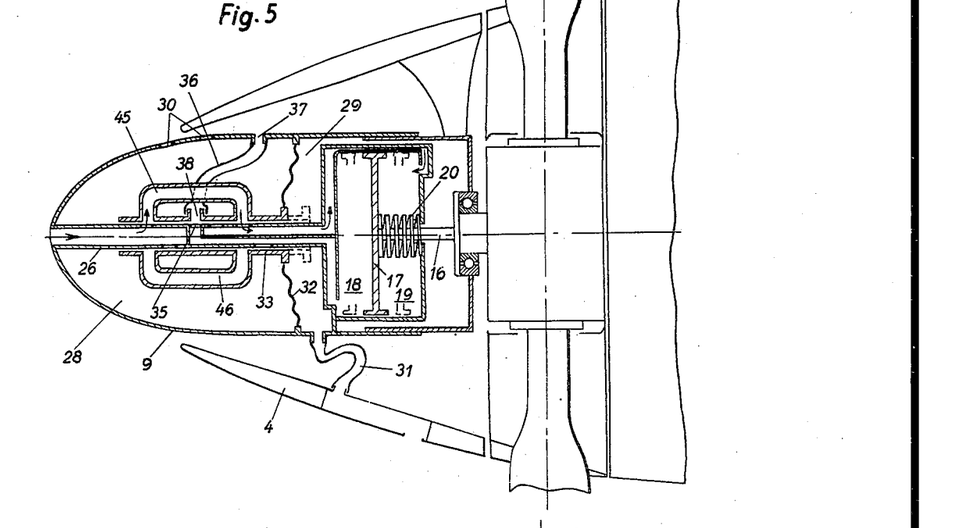
Figs. 5, 6 and 7 are other forms of embodiment in section.

The arrangement represented in Figure 5 is so designed that the inlet cross section is automatically controlled, i. e. in dependence upon two measuring points, in order to make the regulation independent of altitude and speed of flight. This embodiment has further the advantage of responding immediately to any variation of the throughflow of air. In the example of construction of Figure 5 the body 9 is mounted in the fairing and movable in the direction of axis. The body 9 can be mounted as in the other examples of construction on an extension 16 and a wall 17 with the interposition of a returning force 20, acting in the direction of an enlargement of the inlet cross section. The actual position of the body 9 and eventually also the cross sectional area is dependent upon the pressures prevailing in each case in the chambers 18, 19. Both chambers 18, 19 can be alternately put in communication with the conduit 26 opening in the region of dynamic pressure of the body 9. The sleeve 33 provided with transfer passages 45 and 46 and rigidly connected with a diaphragm 32 serves as controlling means. This diaphragm adjusts the control sleeve in the direction of axis, in accordance with the pressure in the inlet conduit and the pressure in the atmosphere. The control sleeve 33 and the transfer passages 45, 46 are so designed that according to the position of the sleeve the chamber 18 or 19 is in communication with the conduit 26, whilst the other chamber 19 or 18 is in connection with the inlet conduit through the intermediate member 36 and the port 37.

The spring 20 has the task to bring the fairing parts serving to vary the airflow anterior to and encompassing the fairing into a position, in which the inlet passage cross section corresponds to the conditions of climbing. The tension of the spring is counteracted during the flight by the dynamic pressure. The control means can be so designed that either for regulating the cross sectional area only the spring tension and the dynamic pressure are used or that for a more complete equalisation of the throughflow velocity to the velocity of the encompassing airflow particular control members are provided, which can be designed according to the already described forms of embodiment, in order to effect the adjustment of the body 9 or of the fairing with the help of the pressure or the pressure drop within the body 9. Further the example of construction of Figure 5 corresponds in its action to that of Figure 3 only that instead of one measuring point 30 there are provided two or more measuring points in the example of construction of Figure 5 and not the fairing 4, but the aerodynamic body 9 is movably mounted.

Figure 6:
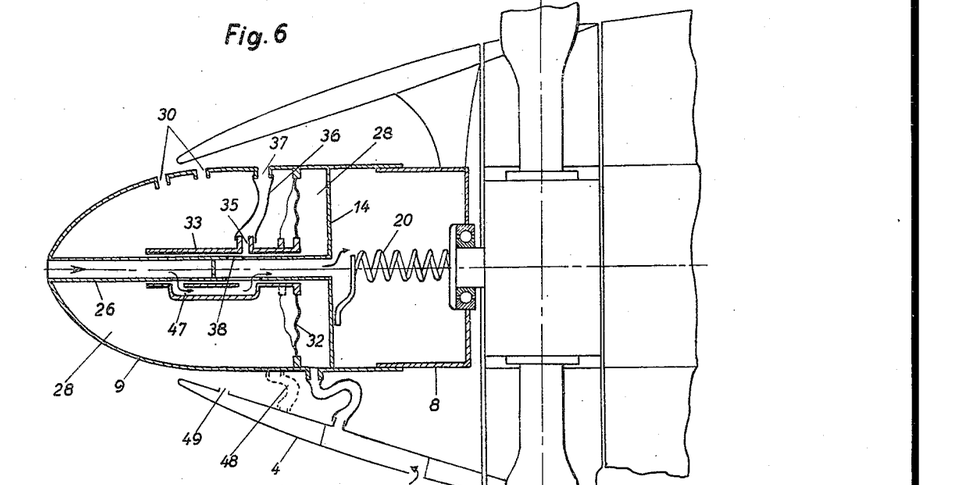

Figure 6 shows an example of construction with a likewise movable streamlined body 9 in a fairing 4, similar to the example of construction of Figure 5. The dynamic pressure reaches through the conduit 26 of the cup-like end member 8 and acts upon the rear wall 14. This will effect the displacement of the body 9 into the upstream region of airflow against the action of the spring 20. The inlet cross sectional area between fairing and aerodynamic body can be reduced by increasing the velocity of the branched-off throughflow as long as it will correspond to the velocity of the encompassing air flow due to the flight speed. It is of course also possible to design the aerodynamic body 9 so that during its displacement the inlet cross sectional area is not submitted to any further variation, but only the airflow anterior to the fairing, flowing through the fairing, and encompassing the fairing is influenced. This regulation is corresponding by principle to the examples of construction of Figures 3 and 5, however with the difference that the control sleeve 33 in the position, in which the apertures 38 and 35 are in communication with the space, enclosed by the cup 8, simultaneously closes the transfer passage 47 serving to deliver air into this space. The aperture 35 of the sleeve valve 33 is connected through the intermediate member 36 and the aperture 37, as shown in the example of construction of Figure 5, with the space within the fairing 4. The diaphragm 32 corresponds in its action to that of Figs. 3 and 5. The chamber 28 can be connected, as shown by the conduit 48 in dotted lines, not only with the two measuring points 30 but also with a further measuring point 49, which takes into account the marginal flow within the fairing.

Figure 7:
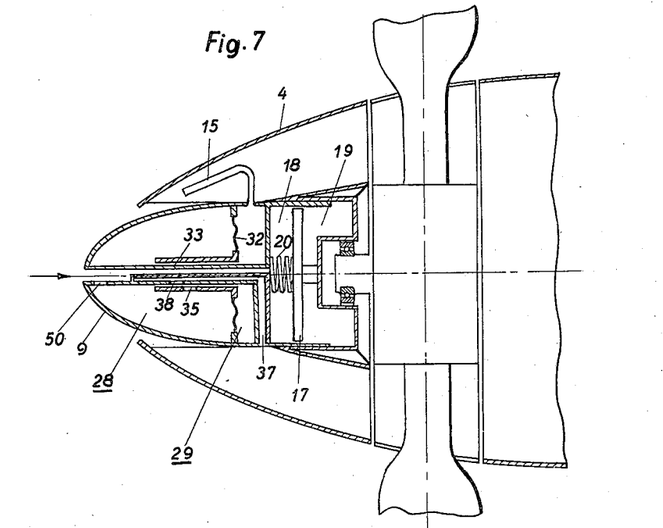

The example of construction of Figure 7 does not differ essentially from the above examples of construction, so that the parts of same action have the same reference numerals. The difference consists only in the fact that for the readjustment the chamber 28 is exposed through the aperture 50 to the direct influence of the dynamic pressure and the chamber 29 to the influence of the pressure in the inlet cross section through the conduit 15, so that the dynamic pressure can escape through the chamber 28 and aperture 37 in case the aperture 38 is uncovered.

Figure 8:
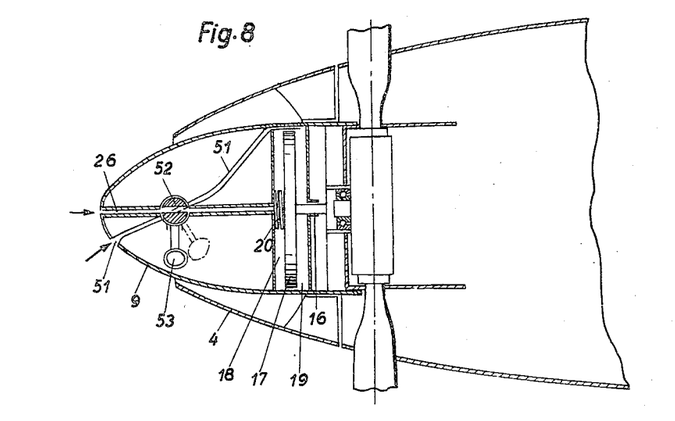
Fig. 8 is a section through a fairing with an aerodynamic body capable of being controlled in accordance with the dynamic pressure during flight taking into consideration the different angles of attack.

The example of construction of Figure 8 shows a fairing of the power plant similar to that of Figure 2. A streamlined body 9 is displaced in the direction of the upstream region with the help of the dynamic pressure being produced through the conduit 26 in the chamber 18. In the displacement body 9 one or more conduits 51 are provided which permit the corresponding dynamic pressure in dependence upon the actual flying attitude to reach the chamber 19 behind the partition wall 17, for being able to exert a correcting influence on the position of the displacement body 9 according to the flying attitude. In the conduits 26 and 51 in common or in one of them preferably in the conduits 51 a particular throttle member 52, preferably designed after the manner of a rotary valve, can be provided, which uncovers the corresponding conduit according to the flying attitude. The regulation of the throttle member 52 can be effected automatically, e. g. by submitting it to the force of gravity by attaching a weight 53 or the like. In such a case the throttle member 52 uncovers according to the flying attitude, in case said throttle member is controlling more of them, the desired conduit. The regulation of the throttle member can be effected of course, as shown in the examples of construction, particularly those of Figures 3 to 7, also by the pressure drop of a plurality of measuring points by means of a special sleeve valve or the like. The provision of special conduits 51 has the advantage that the displacement body 9 will occupy in any flying attitude according to the airflow the actual most favourable position. By accordingly choosing the overlapping of the apertures of the throttle member 52 an exact tuning of the different regulation motions is possible. For diving, e. g. special abutments can be provided for the counterweight 53, fixing the throttle member 52 in a position, in which the conduit 26 is uncovered. The arrangement of a counterweight controlled throttle member 52 preferably conditions a displacement body 9, which is mounted with its fairing 4, as shown in the example of construction of Figure 1, freely rotatable on the propeller casing or on the propeller hub.

Figure 9:
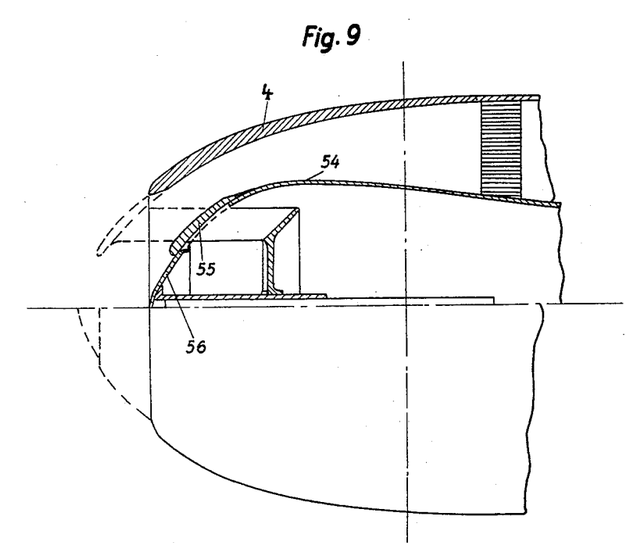
Figs. 9 and 10 show fairings in which the throughflow of air is controlled in stages.
Figure 10:
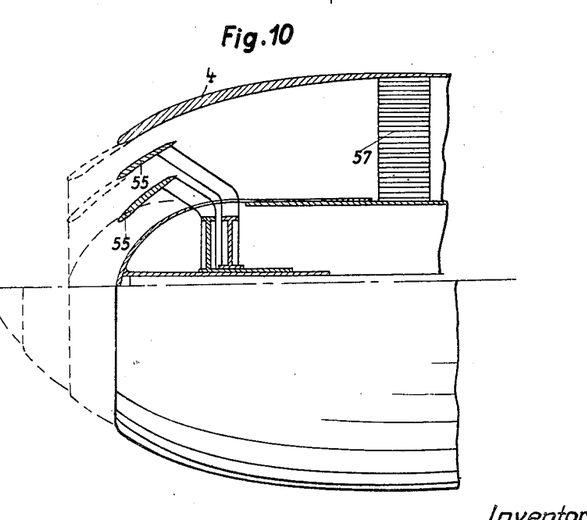

Figures 9 and 10 show examples of construction of a fairing permitting two or more positions of the fairing parts. For this purpose in the fairing 4 and in the air guidance 54, provided within the fairing, one or more annular fairing parts 55 are provided, which, as shown in the example of construction of Fig. 9, when diving, abut on the cooling air guidance 54. Only when the aircraft has passed again to its normal flight speed is the annular fairing part 55 displaced forward in accordance with the dynamic pressure or another regulating value so far into the position shown in dotted lines, that this fairing part forms with the fairing 4 a continuous way for the air flow. The inlet port area is still more advanced by this measure corresponding the higher flight speed, so that as already discussed above, the throughflow velocity can be attuned to that of the encompassing air flow. For diving or with the power plant cutoff, especially in the case of multi-engined aircrafts, the inlet port area can be completely closed by the movable cap 56.

Figure 10 shows as a modification of Figure 9 a further subdivision in two movable fairing parts 55 and 55′, in which it is also possible to fix the fairing parts 55, 55′ in any intermediate position. The fairing 4 is outlined in this example of construction for accommodating a heat exchange device 57 and of course also can find application in an air-cooled internal combustion engine, e. g. a radial engine. The fairing parts are preferably so designed that in all their regulating positions within the fairing and the cooling air guidance 54 a passage is formed diverging in the direction of the heat exchange device 57.

The fairing of this kind has the advantage that among other things during climbing the cooling air will enter always at the stagnation point, i. e. the fairing is not sensitive to variations of the angle of attack. Only when the normal cruising speed with respect to the maximum speed is attained the conditions of flow are correspondingly taken into account and the inlet port area is so far advanced, as already mentioned, that the region of slowed down flow in front of the fairing is declined as far as possible. The example of construction of Figure 10 has still the advantage that, since the fairing parts 55, 55′ are only withdrawn to their full-line position, they can act as twin diffusor in order to reduce in this manner the corresponding conversionlosses, in which case, owing to the subdivision of a fairing of the type described considerable variations of the inlet cross sectional areas are produced notwithstanding the relatively short regulating paths.

Figure 11:
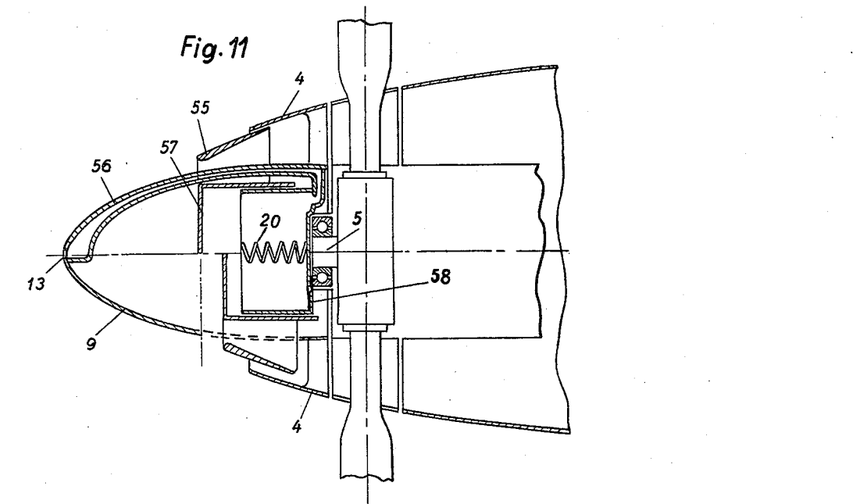
Figs. 11 and 12 show fairings with an undivided inlet port area and automatic control means.
Figure 12:
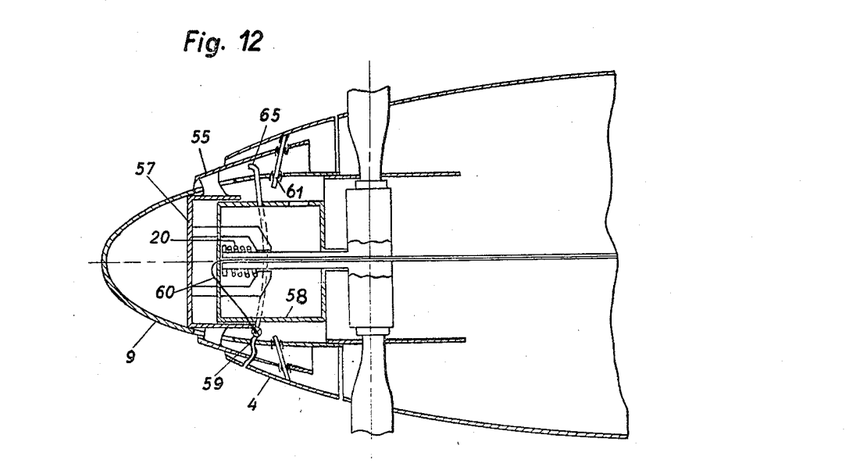

The examples of construction of Figures 11 and 12 finally show another automatic displacement of an annular fairing part 55, e. g. in accordance with the dynamic pressure entering the conduit 56 through the aperture 13 into the aerodynamic body 9. The dynamic pressure reaches through the conduit 56 into the chamber formed by the two walls 57 and 58. The walls 57 and 58 are movable so as to telescope one within the other, under the influence of a returning force 20. The wall 58 is in this case connected with the aerodynamic body 9 and can be mounted with the fairing 4 freely rotatable on the extension 5 of the propeller hub. The wall 57 is in connection with the fairing part 55 through recesses in the aerodynamic body 9 and being capable of sliding motion. The dynamic pressure in the chamber between the two walls 57 and 58 has the effect that the cowling part 55 is displaced more or less far into the upstream region according to the flight speed. By arranging the fairing so as to produce anterior to the aerodynamic body 9 a region of slowed-down airflow, then it is possible by the aid of the movable fairing part 55 in its intermediate positions to influence the boundary line of flow by the fact that a partial stream between the fairing part 55 and the hub fairing 4 is branched-off for circumferentially surrounding the interior flow. In this manner the boundary line of flow is artificially flattened corresponding to the dimensions of the partial stream. Attention must be paid only to the necessity that the inlet cross section for the partial stream is larger than the outlet cross section. In this way the course of the airflow encompassing the cowling 1 shows no discontinuities of pressure. The lower part of Figure 11 shows the position of the fairing part 55 e. g. during climbing.

Figure 12 is a further modification of Figure 11, in which case for the displacement of the fairing part 55 not the full dynamic pressure, but the difference in pressure between the pressure acting outside the fairing 4, and the low pressure and the total pressure prevailing within the fairing part, is used. Within the fairing part 55 a measuring point 58 is provided, discharging e. g. into a chamber formed of two walls 57 and 58 movable telescopically into one another. This chamber is simultaneously in connection with the low pressure zone outside the fairing 4 through the conduit 59. The cross section of the conduit 59 can be varied e. g. manually through a controlling linkage 60 or the like. The ratio of the cross sections of the inlet conduit and the static tube, must preferably be so dimensioned that the compensating pressure being produced within the chamber with the static tube completely opened and the inlet conduit partly opened effects a sufficient opening, i. e displacement of the fairing part 55. A tension spring 20 cares for an automatic return of the regulating parts at a standstill. In order to be able to provide in the case of unforeseen circumstances the full opening of the inlet cross sectional area, the total cross section of the inlet conduit 59 is uncovered. This has as a consequence a decrease of pressure within the fairing, so that the fairing part 55 is withdrawn still further into the fairing 4 with respect to cowling 1. If there is the danger of the aircraft power plant being excessively cooled, the fairing part 55 is then displaced more in the direction of the upstream region by throttling the conduit 59 even to the point where the inlet cross section is completely closed. The fairing part 55 can be connected through a special linkage 61 with the body 9 and the fairing 4 as is further to be seen in the example of construction of Figure 12. This connection has the advantage that with a movable body 9, owing to the position of the articulation points on the linkage 61 a favourable influence on the conditions of flow is possible with relatively small movements.

In the examples of construction of Figs. 13 to 16, the inlet cross section and the fairing are designed deliberately in such a way that the velocity of the throughflowing air is equal to the velocity of the airflow encompassing the fairing and eventually equal to the flight speed. In order to be able in particular flying attitudes, specially in climbing to attune the throughflow velocity again to the flight speed, among other things the inlet cross section of the fairing can be varied. This is effected, according to the invention, by pivotally arranging the fairing 4 or essential parts of it about the axis 25, in a similar way as shown in the examples of construction of Figures 3 and 4. For this purpose the fairing 4 is circumferentially subdivided and provided with a resilient cover. The fairing and regulating means for its cross section can be mounted in this case freely rotatable on an extension or the like of the propeller, as in the other examples of construction. The control members are preferably guided through their axle in case an automatic regulation is not desired.

Figure 14:
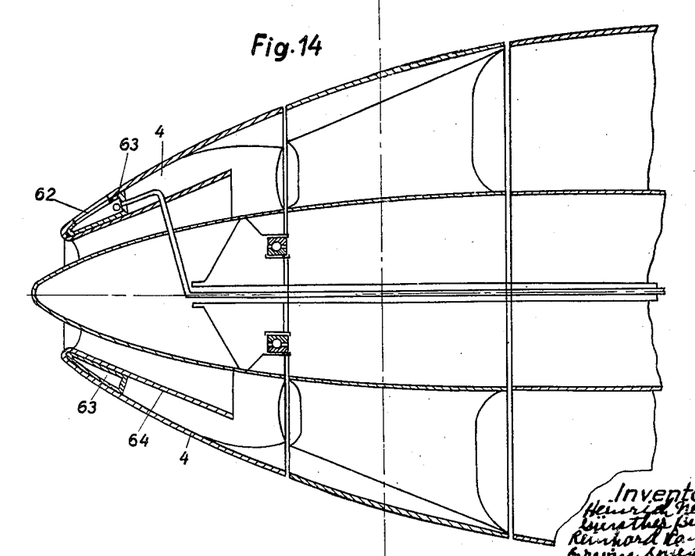

A further development shows the example of construction of Figure 14. In this form of embodiment particular openings 62 are provided in the fairing 4, which can be opened or closed by means of a plurality of sleeves or a common sleeve 63, preferably of annular form. Within the fairing 4 a further cone-shaped fairing part 64 can be provided. Between this fairing part 64 and the fairing 4 is preferably mounted the sleeve 63, which may co-operate with the cone-shaped fairing 64 in such a way that the openings provided in the latter are more or less uncovered. According to the position of the sleeve 63 the inlet cross-sectional area of the fairing 4 and hence the throughflow velocity is varied.

Figure 13:
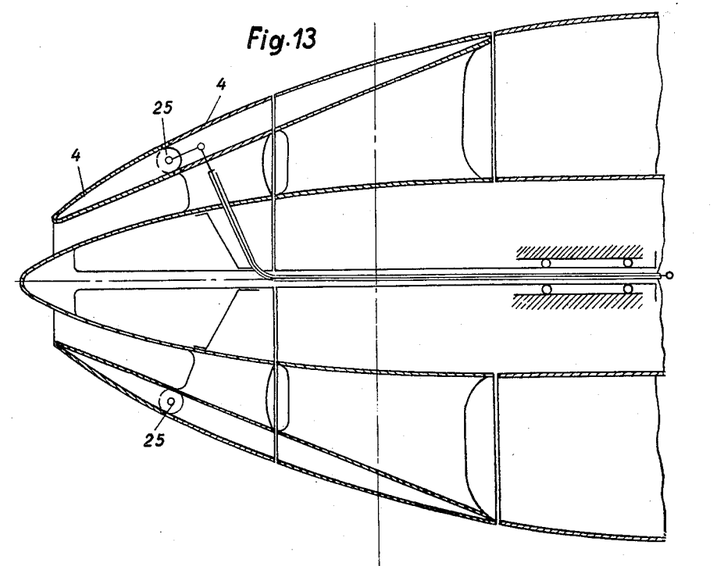
Figs. 13, 14 and 15 show forms of embodiment of the regulating means of a fairing in section.
Figure 15:
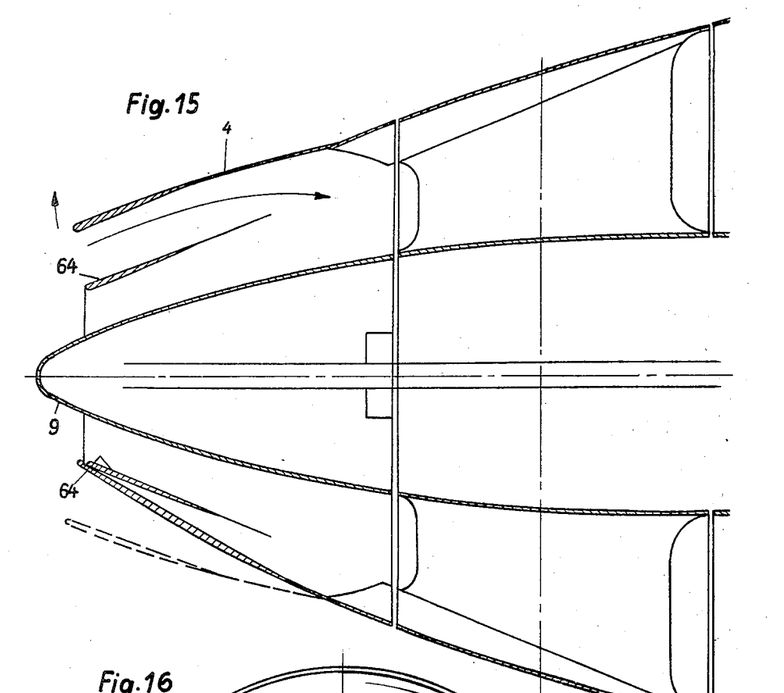
Figure 16:
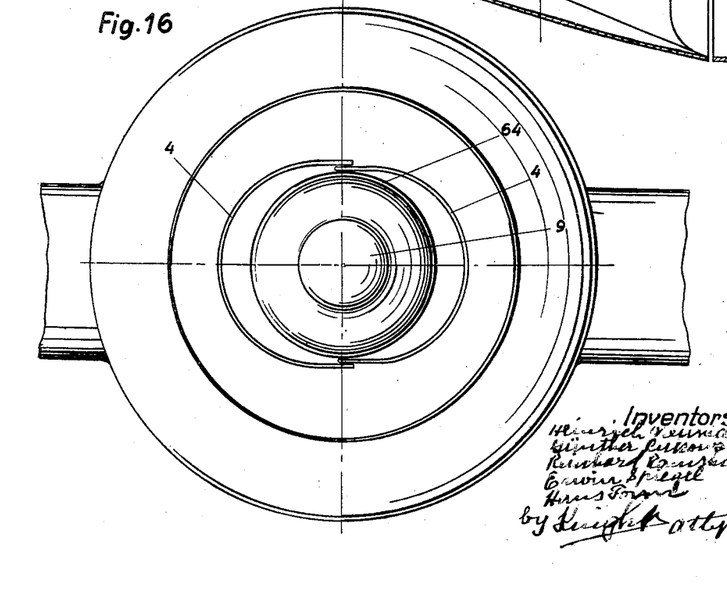
Fig. 16 is a front view of Figure 15.

The example of construction of Figure 15 is likewise a further development of Figure 13, the pivotable fairing part 4 however co-operating with the preferably non-movable, cone-shaped fairing part 64 mounted within the fairing in such a manner that in the closed position only the inlet cross-sectional area between the fairing part 64 and the aerodynamic body 9 is uncovered. This position may correspond to the normal cruising speed. For other flying attitudes, e. g. for climbing, the exterior fairing part 4 is pivoted in the direction of arrow, as shown in the upper part of figure 15, and the inlet cross-sectional area correspondingly increased. The passage formed between the fairing 4 and the fairing 64 further can be so chosen that its inlet cross-sectional area is larger than that of its outlet in case it is desired to use in the intermediate positions the partial stream branched-off by this passage for flattening the boundary line of flow. It is possible to design the pivotable fairing part 4, as shown in Figure 16 in a front view, consisting of two interengaging parts, in which case the pivoting device, in case the fairing system is mounted in the wing of an aircraft, is arranged in the direction of this wing. This has the advantage that no unfavourable influence on the conditions of flow of the wing section is to be expected.

We claim:

1. In an aircraft, a power plant, a cowling surrounding said power plant, a propeller driven by said power plant, a fairing mounted on said propeller and having an external contour which merges with the external contour of said cowling, an orifice in the upstream end of said fairing to permit throughflow of air to cool said power plant, an axially adjustable streamlined body extending from said orifice and shaped to vary the inlet area of said orifice, and means responsive to the air pressure anteriorly of said body for axially adjusting said body thereby to influence the airflow encompassing said fairway and said power plant.

2. An an aircraft, a power plant, a cowling surrounding said power plant, a propeller driven by said power plant, a fairing rotatably mounted on said propeller and having an external contour which merges with the external contour of said cowling, an orifice in the upstream end of said fairing to permit throughflow of air to cool said power plant, extensible means associated with said fairing adjustable to control the amount of throughflowing air, webs in said fairing adapted to be acted upon by the throughflowing air to produce rotation of the fairing in a direction opposite to that of the propeller, and means responsive to the air pressure at a predetermined point for controlling said extensible means thereby to influence the airflow encompassing said fairing and said power plant.

3. In an aircraft, a power plant, a cowling surrounding said power plant, a propeller driven by said power plant, a fairing mounted on said propeller and having an external contour which merges with the external contour of said cowling, an orifice in the upstream end of said fairing to permit throughflow of air to cool said power plant, an axially adjustable streamlined body extending from said orifice and shaped to vary the inlet area of said orifice, a piston in said body and fixed with respect to said fairing, an elastic member associated with said piston for axially biasing said body in a direction to produce the maximum inlet area of said orifice, and an aperture in said body for permitting the external pressure of the air anteriorly of said body to act on that said side of the piston which will cause said streamlined body to reduce the inlet area of said orifice proportionately to said pressure.

4. In an aircraft, a power plant, a cowling surrounding said power plant, a propeller driven by said power plant, a fairing mounted on said propeller and having an external contour which merges with the external contour of said cowling, an orifice in the upstream end of said fairing to permit throughflow of air to cool said power plant, an axially adjustable streamlined body extending from said orifice and shaped to vary the inlet area of said orifice, a piston in said body and fixed with respect to said fairing, an elastic member associated with said piston for axially biasing said body in a direction to produce the maximum inlet area of said orifice, an aperture in said body for permitting the external pressure of the air anteriorly of said body to act on that side of the piston which will cause said streamlined body to reduce the inlet area of said orifice proportionately to said pressure, and a conduit permitting the pressure of the air inside of said fairing to act on the other side of said piston in opposition to said external pressure.

HEINRICH NEUMANN.
GÜNTHER BUKOWSKI.
REINHARD RAMSHORN.
ERWIN SPIEGEL.
HANS TONN.